(12) United States Patent
Hsu

(10) Patent No.: US 7,185,212 B2
(45) Date of Patent: Feb. 27, 2007

(54) METHOD FOR PCI EXPRESS POWER MANAGEMENT USING A PCI PM MECHANISM IN A COMPUTER SYSTEM

(75) Inventor: R-Ming Hsu, Taipei Hsien (TW)

(73) Assignee: Silicon Integrated Systems Corp., Hsin-Chu (TW)

( * ) Notice: Subject to any disclaimer, the term of this patent is extended or adjusted under 35 U.S.C. 154(b) by 501 days.

(21) Appl. No.: 10/604,439

(22) Filed: Jul. 21, 2003

(65) Prior Publication Data

US 2005/0022035 A1 Jan. 27, 2005

(51) Int. Cl.
*G06F 1/00* (2006.01)

(52) U.S. Cl. ............... 713/310; 713/300; 710/100

(58) Field of Classification Search ......... 713/300; 710/100
See application file for complete search history.

(56) References Cited

U.S. PATENT DOCUMENTS

| | | | |
|---|---|---|---|
| 5,974,492 A * | 10/1999 | Gulick | 710/107 |
| 6,282,666 B1 * | 8/2001 | Bays et al. | 713/323 |
| 6,654,896 B1 * | 11/2003 | Saunders et al. | 713/323 |
| 6,675,303 B1 * | 1/2004 | Lam et al. | 713/320 |
| 6,898,766 B2 * | 5/2005 | Mowery et al. | 716/1 |
| 2004/0201956 A1 * | 10/2004 | Conway | 361/686 |
| 2004/0210778 A1 * | 10/2004 | Naveh et al. | 713/300 |
| 2005/0022036 A1 * | 1/2005 | Hsu | 713/300 |

* cited by examiner

*Primary Examiner*—Rehana Perveen
*Assistant Examiner*—James F. Sugent
(74) *Attorney, Agent, or Firm*—Winston Hsu

(57) ABSTRACT

A method for PCI Express Power Management using a PCI PM mechanism in a computer system. The computer system includes a PCI PME (Power Management Event) controller and a PCI Express Root Complex. The method includes converting a Beacon signal generated by the PCI Express Root Complex into a Pseudo-PME signal, the Beacon signal asserting the Pseudo-PME signal. A Pseudo-PME line electrically connected with an PME input of the PCI PME controller and the PCI Express Root Complex is provided for transmitting the Pseudo-PME signal to the PCI PME controller. The PME input receives PME signals generated by PCI-compliant devices through a PCI Bus of the computer system. Before the computer system is under the control of an operating system, the Pseudo-PME signal is de-asserted.

20 Claims, 3 Drawing Sheets

METHOD FOR PCI EXPRESS POWER MANAGEMENT USING A PCI PM MECHANISM IN A COMPUTER SYSTEM

BACKGROUND OF INVENTION

1. Field of the Invention

The present invention relates to a method for power management in a computer system, and more particularly, to a method for PCI (Peripheral Component Interconnect) Express PM (Power Management) using a PCI PM mechanism in a computer system.

2. Description of the Prior Art

According to the PCI (Peripheral Component Interconnect) Express specification for power management of a computer system, a device can use a Beacon signal (a signal of the Physical Layer) to notify the computer system to recover the main power and then use a PM_PME packet (a packet of the Transaction Layer) to request the computer system to generate an interrupt to awaken the computer system from a non-working mode (such as a standby mode or a sleeping mode). The generated interrupt is similar to the PME (Power Management Event) interrupt defined by the PCI specification. Through the interrupt defined by the PCI Express specification, the computer system is not only PCI Express-compliant but also PCI-compliant.

It is expensive to include a PCI Express wakening mechanism, which is similar to a well-known PCI PME controller, when needed to implement a computer system complying with both the PCI Express specification and the PCI specification. Moreover, some software and hardware conflicts (such as conflicting ACPI event reports and conflicting power-on sequences) between the PCI Express specification and the PCI specification exist if original microchips are used for reducing the production cost. Therefore, a cost-effective method is needed to handle the power management of the computer system.

SUMMARY OF INVENTION

It is therefore a primary objective of the claimed invention to provide a method for PCI (Peripheral Component Interconnect) Express PM (Power Management) to solve the above-mentioned problem.

According to the claimed invention, provided is a device and method for PCI Express PM to use a PCI PM mechanism in a computer system having a PCI PME (Power Management Event) controller and a PCI Express Root Complex. The method includes converting a Beacon signal generated by the PCI Express Root Complex into a Pseudo-PME signal, the Beacon signal asserting the Pseudo-PME signal so that a voltage of Pseudo-PME signal changes from a high level to a low level. The claimed invention further provides a Pseudo-PME line electrically connected with a PME input of the PCI PME controller and the PCI Express Root Complex for transmitting the Pseudo-PME signal to the PCI PME controller. The Pseudo-PME signal is de-asserted by the Root Complex after a predetermined time interval and before the computer is under the control of an operating system. The PCI PME may have an event register for reporting the PME to the computer system that is set by the Pseudo-PME signal. The PME input receives PME signals generated by PCI-compliant devices through a PCI Bus of the computer system. A driver program resident in a memory of the computer system may be executed by the computer system to clear the event register when the Pseudo-PME signal changes from the low level to the high level. Both the high level and the low level of the voltage of the Pseudo-PME signal are PCI-compliant.

It is an advantage of the claimed invention that a PCI Express wakening mechanism is not needed to implement a computer system complying with both the PCI Express specification and the PCI specification so that related costs are reduced. Moreover, original microchips can be used to reduce the related costs. Furthermore, the software and hardware conflicts (such as conflicting ACPI event reports and the conflicting power-on sequences) between the PCI Express specification and the PCI specification are eliminated, as there is no second wakening mechanism according to the present invention.

These and other objectives of the present invention will no doubt become obvious to those of ordinary skill in the art after reading the following detailed description of the preferred embodiment that is illustrated in the various figures and drawings.

DETAILED DESCRIPTION

According to the PCI Express specification for power management of a computer system, a device can use a Beacon signal (a signal of the Physical Layer) to notify the computer system to recover the main power and then use a PM_PME packet (a packet of the Transaction Layer) to request the computer system to generate an interrupt to awaken the computer system from a non-working mode (such as a standby mode or a sleeping mode). The PCI Express interrupt is similar to the PME (Power Management Event) interrupt defined by the PCI specification.

In brief, after a device register of a PCI Express-compliant device is set, a plurality of Beacon signals (when the device is provided only with auxiliary power) or PM_PME packets (after the main power and the transaction are recovered) are generated intermittently to notify the computer system to take action on the PME until the computer system clears the device register. The present invention method transforms the Beacon signal of the PCI Express specification into a signal similar to a PME signal of the PCI specification so that a PCI PM (Power Management) mechanism is triggered to take action.

Figure 1:
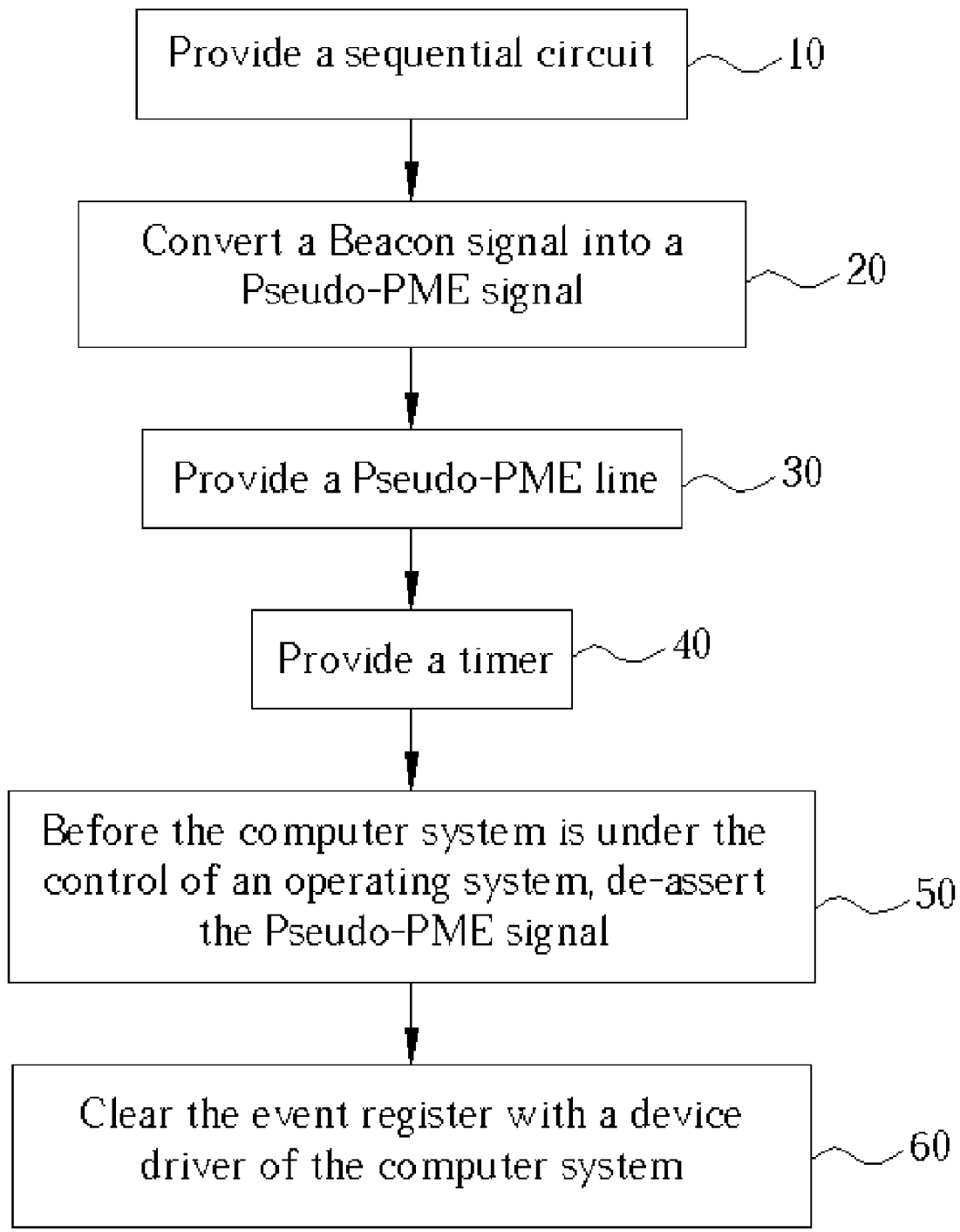
FIG. 1 is a flowchart diagram of a method for PCI Express Power Management using a PCI PM mechanism in a computer system according to the present invention.

Please refer to FIG. 1 showing a flowchart diagram of a method for PCI Express PM using a PCI PM mechanism in a computer system according to the present invention. The computer system includes a PCI PME controller, which is a chipset (microchips) of the computer system handling PCI-compliant devices well-known in the prior art, and a PCI Express Root Complex, which is a PCI Express-compliant intermediate element handling PCI Express-compliant devices. The method is described as follows while the order of steps is not limiting.

Step 10: Provide a sequential circuit, such as a latch or a flip flop, in the PCI Express Root Complex.

Step 20: Convert a Beacon signal generated by the PCI Express Root Complex into a Pseudo-PME signal with the sequential circuit, wherein the Beacon signal asserts the Pseudo-PME signal so that a voltage of Pseudo-PME signal changes from a high level to a low level.

Step 30: Provide a Pseudo-PME line electrically connected with an PME input of the PCI PME controller and the PCI Express Root Complex for transmitting the Pseudo-PME signal generated by the sequential circuit of the PCI Express Root Complex to the PCI PME controller. The PME input receives PME signals generated by PCI-compliant devices through a PCI Bus of the computer system.

Step 40: Provide a timer to control a time interval between asserting and de-asserting the Pseudo-PME signal.

Step 50: Before the computer system is under the control of an operating system, de-assert the Pseudo-PME signal so that the voltage of the Pseudo-PME signal changes from the low level to the high level.

Step 60: Clear the event register with a program stored in a memory of the computer system, such as a device driver.

The high level and the low level of the voltage of the Pseudo-PME signal mentioned above are PCI-compliant so that the PCI PME controller treats the Pseudo-PME signal as a normal PME signal. Without a definition of the PCI specification, the PCI PME controller usually includes an event register (for reporting the PME to the computer system) that can be set by the PCI PME controller when the Pseudo-PME signal (or a PME signal) is asserted but cannot be cleared when the Pseudo-PME signal is de-asserted. Step 60 will solve a problem of inability to clear the event register of a computer system using the abovementioned architecture.

Figure 2:
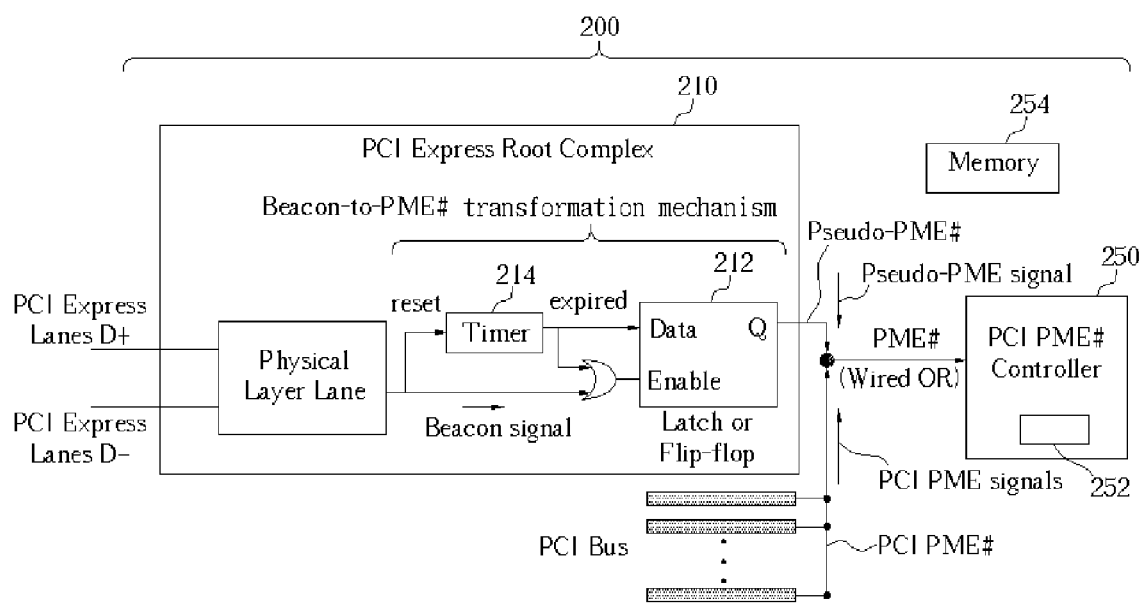
FIG. 2 is a parabolic block diagram of related elements of the computer system of FIG. 1.

Please refer to FIG. 2 showing a parabolic block diagram of related elements of the computer system mentioned in FIG. 1. The PME#, the Pseudo-PME#, the PCI PME#, and the PCI PME# Controller 250 shown in FIG. 2 are the above mentioned PME input, the above mentioned Pseudo-PME line, the line for receiving the above mentioned PME signals, and the above mentioned PCI PME controller respectively.

The present invention correspondingly provides a computer system 200 comprising a PCI Express Root Complex 210 for generating a Beacon signal and a sequential circuit 212 electrically connected to the PCI Express Root Complex 210 for converting the Beacon signal into a Pseudo-PME signal. The sequential circuit 212 is enabled by the Beacon signal so that the sequential circuit 212 starts to send out a low level voltage signal (i.e. the Pseudo-PME signal is asserted).

The computer system 200 further comprises a PCI PME controller 250 comprising an event register 252. The event register 252 reports a power management event to the computer system 200. Further provided in the computer system 200 is a Pseudo-PME line (the Pseudo-PME# shown in FIG. 2) electrically connecting an output of the sequential circuit 212 to a PME input of the PCI PME controller 250. The event register 252 is set when the Pseudo-PME signal changes from a first level to a second level (i.e. the Pseudo-PME signal is asserted). Further provided in the computer system 200 is a memory 254 comprising computer code executed by the computer system 200 when voltage of the Pseudo-PME signal changes from the second level to the first level. The computer code is capable of clearing the event register 252. The first level and the second level of the voltage of the Pseudo-PME signal mentioned above are PCI-compliant. The computer system 200 may further comprise a timer 214 connected to the sequential circuit 212 to control when voltage of the Pseudo-PME signal is changed from the second level to the first level.

Although in FIG. 2 the timer 214 and the sequential circuit are shown within the PCI Express Root Complex 210, this is a choice of design. Those skilled in the art can either implement the timer 214 and the sequential circuit 212 inside or outside the PCI Express Root Complex 210.

A variation of the present invention is described as follows. The timer 214 mentioned above is not the only way to control the time interval between asserting and deasserting the Pseudo-PME signal. This variation further comprises converting a pulse of the Beacon signal into a lower frequency pulse to control the time interval between asserting and de-asserting the Pseudo-PME signal. According to this embodiment, a synchronizer is provided to convert the pulse of the Beacon signal into the lower frequency pulse. When the lower frequency pulse is an active-low pulse, it may be used as the Pseudo-PME signal in the computer system.

The above mentioned variation is useful under the condition of the Beacon signal being designed to work at a relatively high frequency so that the sequential circuit cannot be triggered by the pulse. In this situation, the above mentioned variation can make the pulse-width of the pulse long enough to trigger the sequential circuit.

Figure 3:
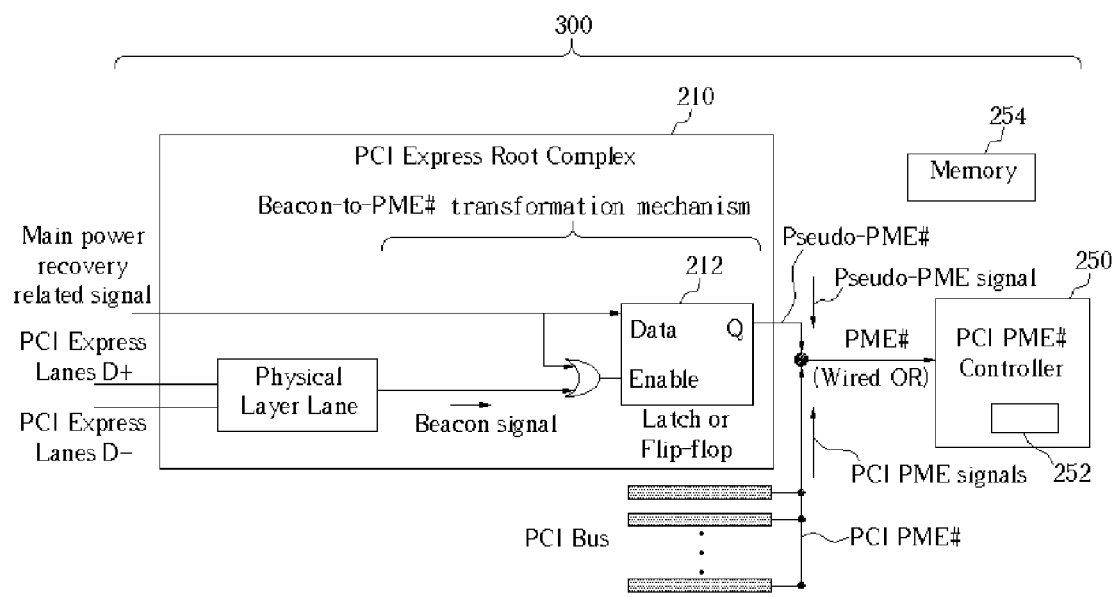
FIG. 3 is a parabolic block diagram of related elements of another computer system according to the present invention.

Another variation of the present invention is disclosed as follows. Again, the timer 214 is not the only way to control the time interval between asserting and de-asserting the Pseudo-PME signal. The computer system 300 of FIG. 3 is generally similar to the computer system 200 except that the computer system 300 lacks the timer 214. A main power recovery related signal is converted into the Pseudo-PME signal to control the time interval between asserting and de-asserting the Pseudo-PME signal. The sequential circuit 212 is enabled by the Beacon signal allowing the main power related recovery signal (at low level voltage) to be grabbed by the sequential circuit 212 so that the sequential circuit 212 starts to send out a low level voltage signal (i.e. the Pseudo-PME signal is asserted). When the main power related recovery signal changes to a high level voltage, the latch is enabled again and the latch starts to send out a high level voltage signal (i.e. the Pseudo-PME signal is de-asserted).

According to the claimed method, the main power recovery related signal could be a PWROK signal, a PSON signal, a RST signal, or a BIOS (Basic Input Output System) driven signal of the computer system. In detail, the PWROK signal and the PSON signal are well-known signals related to the main power recovery sequence of the computer system, while the RST signal is a well-known signal related to the main power recovery sequence defined by the PCI specification. As for the BIOS driven signal, those skilled in the art can alter the BIOS code so that the BIOS can de-assert the Pseudo-PME signal after the main power is recovered through the same input for receiving the other kinds of the main power recovery related signal. Please refer to FIG. 3 showing a parabolic block diagram of related elements of this embodiment of a computer system according to the present invention.

In contrast to the prior art, a PCI Express wakening mechanism is not needed to implement a computer system complying with both the PCI Express specification and the PCI specification so that related costs are reduced. Moreover, original microchips can be used to reduce the related costs while the software and hardware conflicts arising due to differences between the PCI Express specification and the PCI specification are eliminated as there is no second wakening mechanism in the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for Auxiliary-powered Signal Triggered Power Management (ASTPM) using a PCI (Peripheral Component Interconnect) traditional level triggered PM mechanism in a computer system, the computer system including a PCI level triggered PME (Power Management Event) controller and a PCI ASTPM Root Complex, the method comprising:
converting an auxiliary-powered wakeup signal generated by the PCI ASTPM Root Complex into a Pseudo-PME signal, the auxiliary-powered wakeup signal asserting the Pseudo-PME signal so that a voltage of Pseudo-PME signal changes from a first level to a second level;
providing a Pseudo-PME line electrically connecting an output of the PCI ASTPM Root Complex with a PME input of the PCI PME controller for transmitting the Pseudo-PME signal to the PCI PME controller, the PME input receiving PME signals generated by other level triggered devices; and
before the computer system is under the control of an operating system, de-asserting the Pseudo-PME signal so that the voltage of the Pseudo-PME signal changes from the second level to the first level;
wherein the first level and the second level of the voltage of the Pseudo-PME signal are PCI compliant with the level triggered PME controller.

2. The method of claim 1 wherein the PCI PME controller is a chipset of the computer system.

3. The method of claim 1 further comprising providing a sequential circuit to convert the auxiliary-powered wakeup signal into the Pseudo-PME signal.

4. The method of claim 3 wherein the sequential circuit is a latch or a flip flop.

5. The method of claim 1 further comprising providing a timer to control the time interval between asserting and de-asserting the Pseudo-PME signal.

6. The method of claim 1 further comprising converting a pulse of the auxiliary-powered wakeup signal into a lower frequency pulse to control a time interval between asserting and de-asserting the Pseudo-PME signal.

7. The method of claim 6 further comprising providing a synchronizer to convert the pulse of the auxiliary-powered wakeup signal into the lower frequency pulse.

8. The method of claim 6 wherein the lower frequency pulse is an active-low pulse and functions as the Pseudo-PME signal in the computer system.

9. The method of claim 1 further comprising utilizing a main power recovery related signal to control a time interval between asserting and de-asserting the Pseudo-PME signal.

10. The method of claim 9 wherein the main power recovery related signal is a PWROK signal of the computer system.

11. The method of claim 9 wherein the main power recovery related signal is a PSON signal of the computer system.

12. The method of claim 9 wherein the main power recovery related signal is an RST signal of the computer system.

13. The method of claim 9 wherein the main power recovery related signal is a BIOS (Basic Input Output System) driven signal of the computer system.

14. The method of claim 1 wherein the PCI PME controller includes an event register which can be set by the PCI PME controller when the Pseudo-PME signal is asserted but cannot be cleared when the Pseudo-PME signal is de-asserted, the method further comprising clearing the event register with computer code resident in a memory of the computer system.

15. The method of claim 14 wherein the computer code is a device driver of the computer system.

16. A computer system comprising:
a PCI PME controller having a PME input;
a PCI auxiliary-powered Signal Triggered Power Management (ASTPM) Root Complex having an output for outputting a generated Beacon signal;
a sequential circuit electrically connected to the output of PCI ASTPM Root Complex, the sequential circuit having an output for outputting a Pseudo-PME signal of a first voltage level or a second voltage level according to the Beacon signal; and
a Pseudo-PME line electrically connecting the output of the sequential circuit to the PME input of the PCI PME controller;
wherein the first voltage level and the second voltage level are PCI compliant with the level triggered PME controller.

17. The computer system of claim 16 wherein when the sequential circuit inputs a Beacon signal from the PCI ASTPM Root Complex, the Pseudo-PME signal is changed from the first voltage level to the second voltage level.

18. The computer system of claim 17 further comprising a timer connected to the sequential circuit to control when the Pseudo-PME signal is changed from the second voltage level to the first voltage level.

19. The computer system of claim 17 wherein a main power recovery related signal is utilized to control when the Pseudo-PME signal is changed from the second voltage level to the first voltage level.

20. The computer system of claim 17 wherein the PCI PME controller further comprises an event register, the event register being set when the Pseudo-PME signal is changed from the first voltage level to the second voltage level, and the computer system further comprises a memory comprising computer code executed by the computer system when the Pseudo-PME signal changes from the second voltage level to the first voltage level, the computer code clearing the event register.

* * * * *